United States Patent
Austin et al.

(10) Patent No.: US 10,440,092 B2
(45) Date of Patent: Oct. 8, 2019

(54) ALERT GENERATION BASED ON PROXIMATE EVENTS IDENTIFIED BY SOURCE DATA ANALYTICS

(71) Applicant: THE BOEING COMPANY, Chicago, IL (US)

(72) Inventors: Thomas Austin, Rancho Palos Verdes, CA (US); Gary D. Gordon, Renton, WA (US); Jonathan A. Metz, Kirkland, WA (US); James G. Barnes, Los Angeles, CA (US); Radford J. Sorensen, Carnation, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 15/158,068

(22) Filed: May 18, 2016

(65) Prior Publication Data
US 2017/0339006 A1    Nov. 23, 2017

(51) Int. Cl.
*G06F 15/16* (2006.01)
*H04L 29/08* (2006.01)

(52) U.S. Cl.
CPC .............. *H04L 67/02* (2013.01); *H04L 67/10* (2013.01); *H04L 67/18* (2013.01)

(58) Field of Classification Search
CPC ..... G06Q 30/0261; H04L 51/32; H04L 51/20; H04L 12/1845; H04L 12/1895; H04L 51/04
See application file for complete search history.

(56) References Cited

U.S. PATENT DOCUMENTS

| | | | |
|---|---|---|---|
| 8,639,767 B1* | 1/2014 | Harris | G06Q 50/01 709/202 |
| 9,230,101 B2 | 1/2016 | Zahran | |
| 9,609,479 B1* | 3/2017 | Bostick | H04W 4/021 |
| 2013/0238356 A1 | 9/2013 | Torii et al. | |
| 2014/0164505 A1* | 6/2014 | Daly | H04L 67/02 709/204 |
| 2014/0195625 A1* | 7/2014 | Weldon | H04L 51/32 709/206 |
| 2014/0222531 A1* | 8/2014 | Jacobs | G06Q 50/01 709/204 |
| 2014/0359008 A1* | 12/2014 | Finney | G06Q 10/00 709/204 |
| 2015/0099481 A1* | 4/2015 | Maitre | H04W 4/22 455/404.2 |

* cited by examiner

*Primary Examiner* — Suraj M Joshi
*Assistant Examiner* — Ayele F Woldemariam
(74) *Attorney, Agent, or Firm* — Toler Law Group, PC (57) ABSTRACT

A method includes receiving, at a computing device from a social media platform, a first post associated with a first social media account. The method also includes determining, by the computing device, an event category of an event described in the first post. The method further includes determining, by the computing device, an estimated location associated with the event. The method also includes determining, by the computing device, a distance threshold based on the event category. The method further includes determining, by the computing device, whether a location of concern is within the distance threshold of the estimated location. The method also includes generating, by the computing device, an alert based on a determination that the location of concern is within the distance threshold of the estimated location.

18 Claims, 5 Drawing Sheets

ALERT GENERATION BASED ON PROXIMATE EVENTS IDENTIFIED BY SOURCE DATA ANALYTICS

FIELD OF THE DISCLOSURE

The disclosure generates actionable alerts based on analysis of source data including social media posts and news feeds. The discussion below refers to "social media" as an example of the use of the developed methods and technologies, but the use of these approaches is not limited to just social media feeds.

BACKGROUND

In certain scenarios, it may be beneficial for one or more parties at a particular location to receive real-time (or near real-time) status updates about events or incidents that are occurring at the particular location or are anticipated to occur at the particular location. As a non-limiting example, if an active shooter is on the campus of a particular company, it would be beneficial for employees of the company to receive real-time updates about the location, history, and capability of the active shooter to take the appropriate safety precautions. As another non-limiting example, if a natural disaster (e.g., an earthquake) occurs in a particular geographical region, residents in the particular geographical region may desire to receive real-time updates about the earthquake's impact and cascading consequences, including aftershocks.

One technique used for receiving real-time updates about an event is exploiting data from a wide range of public and private sources, including news feeds or social media platforms to monitor social media posts about the event. However, some social media posts may not be reliable. For example, some social media posts may be generated by non-trusted sources and may include inaccurate information. Additionally, everybody that desires to receive real-time updates about a particular event may not have access to specific social media platforms nor the capability to detect actionable data with which to monitor the social media posts about the particular event.

SUMMARY

According to one implementation of the present disclosure, a method includes receiving, at a computing device from a social media platform, a first post associated with a first social media account. The method also includes determining, by the computing device, an event category of an event described in the first post. The method further includes determining, by the computing device, an estimated location associated with the event. The method also includes determining, by the computing device, a distance threshold based on the event category. The method further includes determining, by the computing device, whether a location of concern is within the distance threshold of the estimated location. The method also includes generating, by the computing device, an alert based on a determination that the location of concern is within the distance threshold of the estimated location.

According to another implementation of the present disclosure, a computing device includes a processor and a memory accessible to the processor. The memory stores instructions that are executable by the processor to cause the processor to perform operations including receiving, from a social media platform, a first post associated with a first social media account. The operations also include determining an event category of an event described in the first post and determining an estimated location associated with the event. The operations further include determining a distance threshold based on the event category and determining whether a location of concern is within the distance threshold of the estimated location. The operations also include generating an alert based on a determination that the location of concern is within the distance threshold of the estimated location.

According to another implementation of the present disclosure, a non-transitory computer-readable storage device stores instructions that are executable by a processor to cause the processor to perform operations. The operations include receiving, from a social media platform, a first post associated with a first social media account. The operations also include determining an event category of an event described in the first post and determining an estimated location associated with the event. The operations further include determining a distance threshold based on the event category and determining whether a location of concern is within the distance threshold of the estimated location. The operations also include generating an alert based on a determination that the location of concern is within the distance threshold of the estimated location.

The features, functions, and advantages that have been described can be achieved independently in various implementations or may be combined in yet other implementations, further details of which are disclosed with reference to the following description and drawings.

DETAILED DESCRIPTION

Particular implementations of the present disclosure are described below with reference to the drawings. In the description, common features are designated by common reference numbers throughout the drawings.

The described system provides a methodology for a computing device to extract material from a social media platform, from other continuous, non-deterministic, aperiodic, or periodic datastreams, or a combination thereof. The computing device may also categorize the extracted material, determine relevancy and reliability of the extracted material using heuristic rule-based screening algorithms, and alert a human operator ("analyst") for further response actions (e.g., further notification of security professionals, corporate executives, a workforce, etc.) based on the extracted information. Algorithmic features may also assist in automated geo-location of the reported event. A detailed description of the architecture and dataflow of the process is provided in the sections below.

Figure 1:
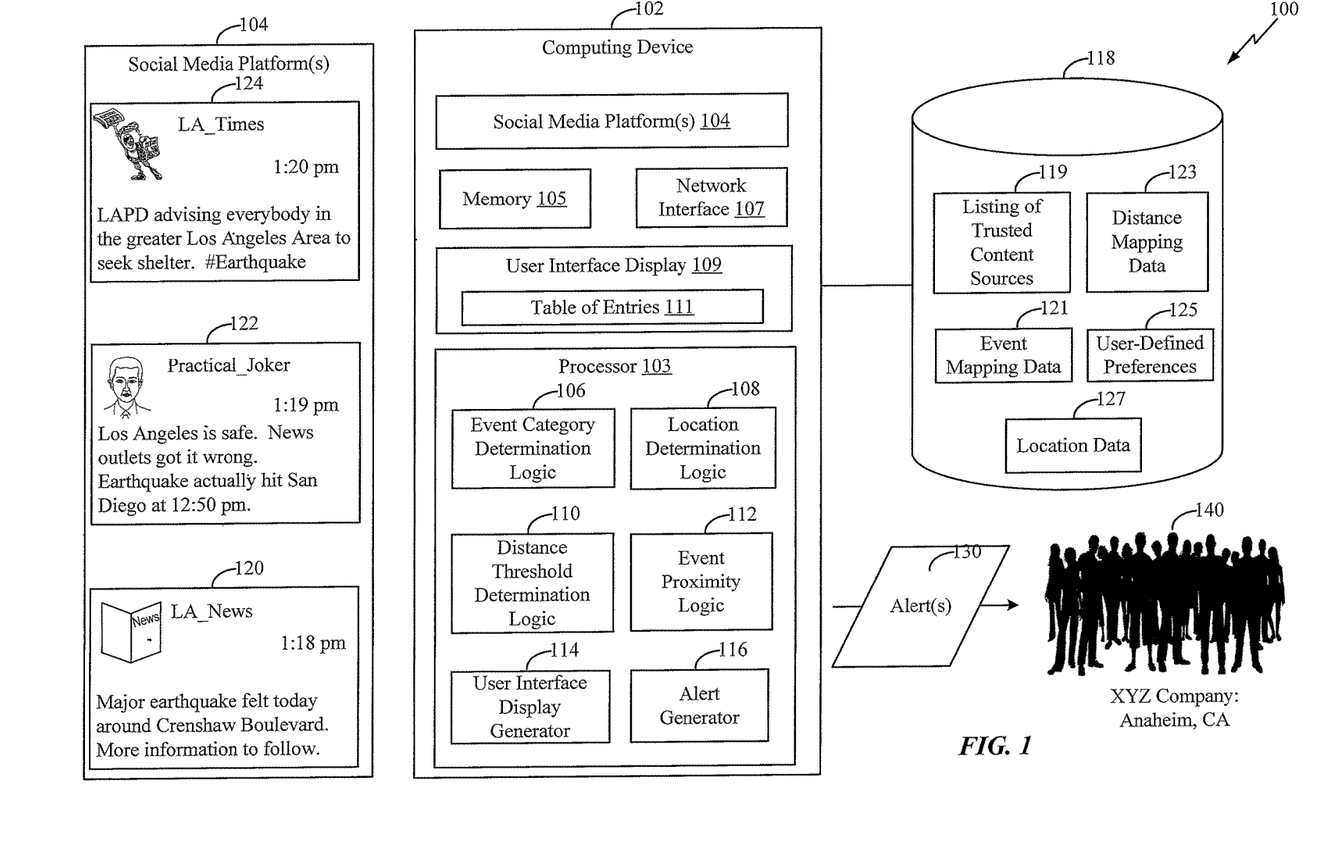
FIG. 1 depicts an example of a computing device that is operable to generate one or more alerts based on source data including social media posts.

Referring to FIG. 1, a system 100 that is operable to generate one or more alerts based on multiple sources (e.g., social media posts) is shown. According to one implementation, the system 100 may generate the one or more alerts based on data from any available source (e.g., "all source data"). The system 100 includes a computing device 102 that is operable to receive one or more social media posts from one or more social media platforms and to generate at least one alert based on the social media posts. The computing device 102 includes a processor 103, a memory 105, a network interface 107, and a user interface display 109. The memory 105 may be a non-transitory computer-readable storage device that stores instructions that are executable by the processor 103.

One or more social media platforms 104 may be accessible to the computing device 102 via the network interface 107. For example, the computing device 102 may download data or an application associated with the one or more social media platforms 104 from a server (not shown). According to some implementations, the one or more social media platforms 104 may include platforms such as www.facebook.com, www.twitter.com, www.instagram.com, etc. It should be noted that the above-identified social media platforms are merely provided as non-limiting examples and should not be construed as limiting. According to other implementations, different social media platforms may be integrated into the computing device 102.

The processor 103 includes data source trustworthiness logic configured to determine a level of trust associated with an account (e.g., a social media account), event detection logic, event severity determination logic, event category determination logic 106, location determination logic 108, distance threshold determination logic 110, event proximity logic 112, a user interface display generator 114, and an alert generator 116. A database 118 may be coupled to (or included in) the computing device 102. The database 118 may store a listing of trusted content sources 119. The list of trusted content sources 119 may include a list of "trusted" social media accounts (e.g., reliable social media accounts). Although the components 106-116 are in a single device (e.g., the computing device 102) in FIG. 1, in other implementations, the components 106-116 may be in multiple devices (e.g., a system of interconnected devices or processors).

The one or more social media platforms 104 may receive or access one or more social media posts. As a non-limiting example, the one or more social media platforms 104 may receive a first social media post 120 associated with a first social media account, a second social media post 122 associated with a second social media account, and a third social media post 124 associated with a third social media account. In the example illustrated in FIG. 1, the first social media account is registered with the Los Angeles News under the username "LA_News", the second social media account is registered to a private user under the username "Practical_Joker", and the third social media account is registered with the Los Angeles Times under the username "LA_Times".

According to FIG. 1, the Los Angeles News posted the first social media post 120 at 1:18 pm. The first social media post 120 reads "Major earthquake felt today around Crenshaw Boulevard. More information to follow". The private user posted the second social media post 122 at 1:19 pm. The second social media post 122 reads "Los Angeles is safe. News outlets got it wrong. Earthquake actually hit San Diego at 12:50 pm". The Los Angeles Times posted the third social media post 124 at 1:20 pm. The third social media post 124 reads "LAPD advising everybody in the greater Los Angeles Area to seek shelter. #Earthquake".

According to one implementation, the social media posts 120, 122, 124 may be filtered using a social media data feed extraction techniques. For example, an analyst may enter heuristically determined search terms into a search field (e.g., a Boolean Query Table) and the search terms may be provided to a server (not shown). According to one implementation, the server may detect the post based on a heuristically-determined word pattern search. The server may extract different social media posts from a variety of social media platforms and provide the extracted social media posts (e.g., the selected social media posts) to the computing device 102. The search terms may indicate preferred and trusted data sources (e.g., LA_Times and LA_News) for social media posts, preferred event categories for social media posts (e.g. earthquake, shooter, etc.), preferred locations of social media posts, etc.

According to one implementation, there may be a range of preferred event categories indicated by the search terms representing manmade incidents, natural disasters, accidents, or other themes. The selected social media posts may be provided to a heuristic rules engine employing advanced queries with multiple keywords, multiple spelling variations, and patterns of keyword groupings arranged in a specific order and word proximity range. According to one implementation, the rules engine may be may implemented using logic accessible by the processor 103. The rules engine may be applied to extract the social media posts 120, 122, 124 from the selected social media posts. The one or more rules may be based on user-defined terms, user-defined event categories, etc.

The event category determination logic 106 may be configured to determine an event category of an event described in each social media post. For example, the event category determination logic 106 may determine that each social media post 120, 122, 124 is associated with an earthquake (e.g., the "event") based on the text provided in the social media posts 120, 122, 124. For example, the first and second social media posts 120, 122 include the term "earthquake" and the third social media post 124 includes an "earthquake" hashtag. Thus, the event category may be determined by comparing terms in the first social media post 120 (or the other social media posts 122, 124) to event mapping data 121 that maps particular terms to corresponding event categories. The event mapping data 121 may be stored in the database 118. Based on the determination, the event category determination logic 106 may determine that each social media post 120, 122, 124 may be categorized as under an "earthquake" event category or a "natural disaster" event category.

The location determination logic 108 may be configured to determine an estimated location associated with the event. According to one implementation, the location determination logic 108 may access a biography of each social media account to determine the location of the social media account (e.g., a source location associated with the social media account). For example, the biography of each social media account may include "Los Angeles, Calif." in a "geographic location" field. Based on the information in the geographic location field, the location determination logic 108 may determine that the earthquake is located in Los Angeles, Calif.

According to one implementation, the location determination logic 108 may determine a second estimated location associated with the event. The second estimated location may be determined based on content of the first social media post 120 that is descriptive of a geographic location of the event (e.g., an event location). For example, the location determination logic 108 may determine the second estimated location of the earthquake based on the text provided in the social media posts 120, 122, 124. To illustrate, the first social media post 120 includes the phrase "Crenshaw Boulevard" and the third social media posts 124 includes the phrase "Los Angeles Area". Thus, based on the text provided in the first and third social media posts 120, 124, the location determination logic 108 may determine that the second estimated location of the event (e.g., the earthquake) is Los Angeles, Calif.

According to one implementation, the second estimated location may be determined by performing a map search based on a location descriptive term (e.g., "Los Angeles Area") in the first social media post 120. The second estimated location may further be determined by generating, based on a result of the map search, a map display that includes a representation of a particular geographic location, the location descriptive term, and a selectable option to designate the particular geographic location as the second estimated location.

The text provided in the second social post 122 indicates two different locations, Los Angeles and San Diego. Based on the context of the text, the location determination logic 108 may determine the event occurs in San Diego, as opposed to Los Angeles. However, the location determination logic 108 may determine that the second social media account (e.g., "Practical_Joker") is not a trusted content source and that the first and third social media accounts (e.g., "LA_News" and "LA_Times") are trusted content sources. For example, the listing of trusted content sources 119 in the database 118 may identify the first and third social media accounts as trusted content sources. The second social media account may not be listed in the listing of trusted content sources 119. Thus, the location determination logic 108 may determine that the second social media account is a non-trusted content source and may disregard information from the second social media post 122, including the location information.

The distance threshold determination logic 110 may be configured to determine a distance threshold based on the event category. For example, determining the distance threshold may include accessing distance mapping data 123 that maps particular event types to corresponding distance thresholds. The distance mapping data 123 may be stored in the database 118. As described above, the social media post 120, 122, 124 may be categorized under the "earthquake" event category. The distance threshold determination logic 110 may look up earthquake events in the distance mapping data 123 to determine a distance threshold of the event (e.g., the earthquake). As a non-limiting example, the distance threshold determination logic 110 may determine that the threshold for an earthquake spans 150 miles from the center of the earthquake. Thus, the distance threshold determination logic 110 may determine the distance threshold for the earthquake associated with the social media posts 120, 122, 124 is 150 miles.

In other implementations, the distance threshold may be user-specified. For example, a social media post may specify a range of impacted areas for a particular event. To illustrate, a fourth social media post (not shown) may include text stating that vibrations from the earthquake have been felt as far as 125 miles away. As another example, the distance mapping data 123 may include distance thresholds that are specified by an analyst (or user). To illustrate, the analyst may store distance mapping data 123 in the database 118 to indicate that the distance threshold for an earthquake is 150 miles. It should be noted that different events may have different distance thresholds. As a non-limiting example, an active shooter (e.g., gunman) on the campus of a business may have a distance threshold of approximately 5 miles.

The event proximity logic 112 may determine whether a location of concern is within the distance threshold of the estimated location. For example, the event proximity logic 112 may determine whether the location of concern is within 150 miles of Los Angeles, Calif. (e.g., the estimated location of the earthquake). The computing device 102 may determine the location of concern based on user-defined preferences 125. The user-defined preferences 125 may be stored in the database 118. To illustrate, a user of the computing device 102 may set the location of concern to a particular city, geographic region, street address, etc. In FIG. 1, the location of concern is set to the city of a particular business. For example, the location of concern is set to Anaheim, Calif. (e.g., the city where XYZ Company is located). Thus, the event proximity logic 112 may determine whether Anaheim, Calif. is within 150 miles of Los Angeles, Calif. The computing device 102 may also determine the location of concern is within the distance threshold of the estimated location by accessing location data 127 that specifies geographic locations of a set of locations of concern and determining, based on the location data 127 and the distance threshold, whether any location of concern of the set of locations is within the threshold distance of the estimated location. The location data 127 may be stored in the database 118. It should be noted that the location of concern illustrated in FIG. 1 is merely for illustrative purposes and should not be construed as limiting. As described below, one or more alerts 130 may be generated if the location of concern is within the distance threshold of the estimated location.

Figure 2:
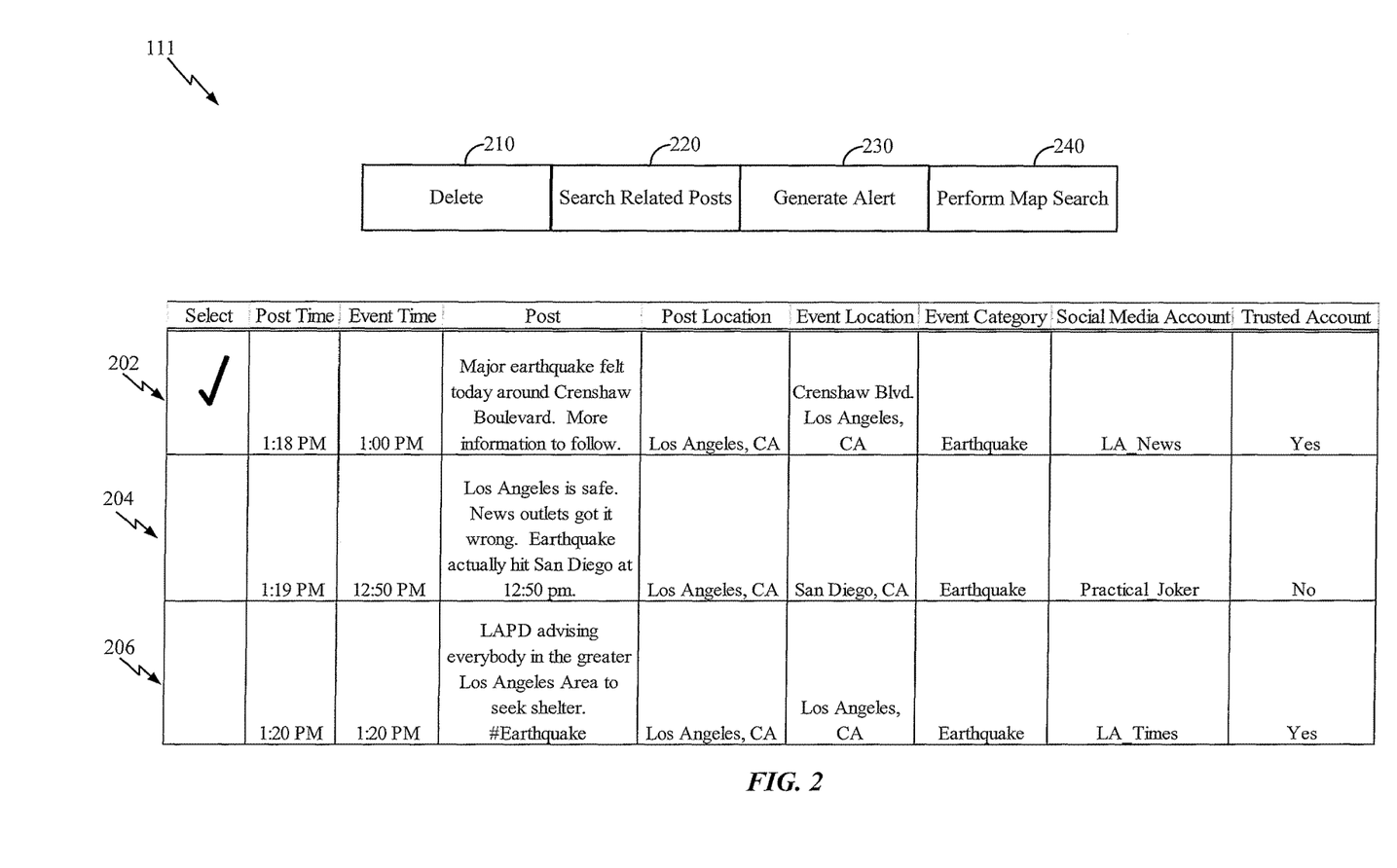
FIG. 2 depicts a table of entries generated by the computing device of FIG. 1.

The user interface display generator 114 may be configured to generate the user interface display 109 that includes a table of entries 111, as described in greater detail with respect to FIG. 2. The table of entries 111 may include one or more entries associated with the event (e.g., the earthquake). As described in greater detail with respect to FIG. 2, each entry may include information associated with a particular social media post 120, 122, 124. For example, a first entry may include information associated with the first social media post 120, a second entry may include information associated with the second social media post 122, a third entry may include information associated with the third social media post 124, etc. According to some implementations, each entry in the table of entries may be monitored by an analyst (or operator) of the computing device 102. The table of entries 111 may also include entries associated with a second event. Entries associated with the second event may include a category of the second event and an estimated location of the second event. As described with respect to FIG. 2, each entry in the table of entries 111 may be associated with one or more selectable options.

The alert generator 116 may be configured to generate one or more alerts 130 if the location of concern is within the distance threshold of the estimated location. For example, the alert generator 116 may send an electronic notification to one or more parties 140 associated with the location of concern if the location of concern is within the distance threshold of the estimated location. The electronic notification may include information in the social media posts 120, 124 from trusted content sources. For example, the electronic notification may include information in the first and third social media posts 120, 124. According to the implementation described with respect to FIG. 1, the one or more parties 140 may include employees of XYZ Company in Anaheim, Calif. However, in other implementations, the one or more parties 140 may include other groups of people located in the vicinity of the location of concern.

According to some implementations, the computing device 102 (or an analyst monitoring the table of entries 111) may determine to generate an alert 130 based on a particular social media post characteristics of the particular social media post. For example, the computing device 102 may determine the credibility of the particular social media post. To determine the credibility, the computing device 102 may determine whether the source of the particular social media post is included in the listing of trusted content sources 119. If the source of the particular social media post is not included in the listing of trusted content sources 119, the computing device 102 may determine that the particular social media post is not credible and may evaluate the next social media post. If the source of the particular social media post is included in the listing of trusted content sources 119, the computing device 102 may determine that the particular social media post is credible. According to other implementations, each source may have a credibility rating based on a number of subscribers. Thus, if the source of the particular social media post has a number of subscribers that exceeds a threshold (e.g., one million), the computing device 102 may determine that the particular social media post is credible. According to another implementation, the computing device 102 may determine that particular social media post is credible if the source is "verified" according to a social media platform.

If the computing device 102 determines that the particular social media post is credible, the computing device 102 may determine whether the event (e.g., the incident) described in the particular social media post is a severe event. For example, the computing device 102 may evaluate the text of the particular social media post to determine whether event related keywords (stored in the database 118) are included in the text. Non-limiting examples of keywords may include damage, threat, alert, death, severe, harm, etc. If one or more keywords are not included in the text of the particular social media post, the computing device 102 may determine that the event described in the particular social media post is not a severe event and may evaluate the next social media post. If one or more keywords are included in the text of the particular social media post, the computing device 102 may determine that the event described in the particular social media post is a severe event.

If the computing device 102 determines that the event described in the particular social media post is a severe event, the computing device 102 may determinate a location of the event described in the particular social media post. For example, the computing device 102 may evaluate words or phrases in the text of the particular social media post to determine whether the location of the event may be located based on the words or phrases (e.g., determine whether the event is geo-locatable). As described above, the computing device 102 may compare the words or phrases to the event mapping data 121 to determine the location of the event. For example, the computing device 102 may identify buildings, landmarks, street names, etc. in the text of the particular social media post. The computing device 102 may compare the identified terms to terms in the event mapping data 121. If an identified term is included in the event mapping data 121, the computing device 102 may set the location to a corresponding location associated with the term in the event mapping data 121. According to one implementation, the locations in the event mapping data 121 may indicate the latitude and longitude coordinates associated with the identified terms. If the event is not geo-locatable based on the text in the particular social media post, the computing device 102 may discard the particular social media post and may evaluate the next social media post. If the event is geo-locatable based on the text in the particular social media post, the computing device 102 may determine the location of the event.

In response to determining the location of the event, the computing device 102 may determine whether the location of the event is proximate (e.g., within a distance threshold) to the location of concern. As described above, the event proximity logic 112 may determine whether the location of concern is within the distance threshold of the location of the event (e.g., the estimated location). According to one implementation, the computing device 102 may access a location database that indicates a residence address (or business address) of the one or more parties 140. If the location of the event is proximate to the residence address (or business address) of a particular person in the location database, the computing device 102 may generate an alert 130 for the particular person.

The system 100 of FIG. 1 may enable the computing device 102 to alert one or more parties 140 of different events occurring near a location of the one or more parties 140. Because the alerts 130 are generated based on social media posts from trusted content sources, the information provided to the one or more parties in the alerts 130 may be reliable and time-sensitive. For example, the one or more parties 140 may receive the information in near-real time as opposed to waiting for the evening news to receive the information.

Referring to FIG. 2, the table of entries 111 is shown. The table of entries 111 includes a first entry 202, a second entry 204, and a third entry 206. Although three entries 202, 204, 206 are shown in the table of entries 111, in other implementations, the table of entries 111 may include additional entries. As a non-limiting example, the table of entries 111 may include fifteen entries.

The first entry 202 may be associated with the event in the first social media post 120. The first entry 202 may also include the event category of the first social media post 120 and first information based on the first social media post 120. For example, the first entry 202 may include the post time of the first social media post 120, the event time of the subject matter in the first social media post 120, the text of the first social media post 120, the post location (e.g., the source location) of the first social media post 120, the event location of the event mentioned in the first social media post 120, the event category of the first social media post 120, the social media account associated with the first social media post 120, and an indication of whether the social media account is a trusted account. According to one implementation, if the first social media post 120 includes a hyperlink to a website or picture, the first entry 202 may also include the hyperlink.

The second entry 204 may be associated with the event in the second social media post 122. The second entry 204 may also include the event category of the second social media post 122 and second information based on the second social media post 122. For example, the second entry 204 may include the post time of the second social media post 122, the event time of the subject matter in the second social media post 122, the text of the second social media post 122, the post location (e.g., the source location) of the second social media post 122, the event location of the event mentioned in the second social media post 122, the event category of the second social media post 122, the social media account associated with the second social media post 122, and an indication of whether the social media account is a trusted account.

The third entry 206 may be associated with the event in the third social media post 124. The third entry 206 may also include the event category of the third social media post 124 and third information based on the third social media post 124. For example, the third entry 206 may include the post time of the third social media post 124, the event time of the subject matter in the third social media post 124, the text of the third social media post 124, the post location (e.g., the source location) of the third social media post 124, the event location of the event mentioned in the third social media post 124, the event category of the third social media post 124, the social media account associated with the third social media post 124, and an indication of whether the social media account is a trusted account.

Each entry 202, 204, 206 may also include one or more selectable options. As a non-limiting example, an analyst may select one or more entries 202, 204, 206 by moving a cursor to the respective entry and clicking the cursor. The analyst may click the cursor on a delete option 210 to delete the selected entry. For example, each entry 202, 204, 206 may be associated with a respective selectable option to remove the entry from the table of entries 111. To illustrate, if the first entry 202 is selected, and the analyst clicks (e.g., selects) the delete option 210, the first entry 202 may be removed from the table of entries 111. According to some implementations, additional entries (not shown) that have similar information to the first entry 202 may also be deleted from the table of entries 111 in response to deleting the first entry 202. As a non-limiting example, entries by the same social media account as the first entry 202 may be deleted from the table of entries 111 in response to deleting the first entry 202. Similar functions may be performed with respect to the second and third entries 204, 206.

The analyst may also click the cursor on a search related posts option 220 to search related entries. For example, if the first entry 202 is selected, and the analyst clicks the search related posts option 220, the computing device 102 of FIG. 1 may generate a search request based on the first entry 202. For example, the computing device 102 may search, based on the search request, a database of other social media posts to identify another social media post that includes additional information related to the event described in the first social media post 120.

To illustrate, the computing device 102 may search for social media posts from the same social media account (e.g., LA_News) as the first social media post 120, search for social media posts indicating a location (e.g., Crenshaw Blvd) mentioned in the first social media post 120, search for social media posts having a similar event category (e.g., earthquake) as the first social media post 120, etc. The search request may also specify a time range based on a time associated with the event. For example, the computing device 102 may search for social media posts that describe events occurring at approximately 1:00 pm. According to one implementation, the computing device 102 may enable the analyst the edit the search request prior to searching the database to identify other social media posts. As a non-limiting example, the analyst may specify whether to exclude non-trusted sources from the search request. According to one implementation, the computing device 102 may enable the analyst to select keywords in the first social media post 120 for which to base the additional search.

The analyst may also click the cursor on a generate alert option 230 to generate the one or more alerts 130 based on the selected entry. For example, if the first entry 202 is selected, and the analysts clicks the generate alert option 230, the computing device 102 of FIG. 1 may generate an alert based on the first entry 202. If multiple entries are selected and the analyst clicks the generate alert option 230, the computing device 102 may generate an alert 130 for each selected entry. Thus, according to one implementation, the analyst may monitor each entry in the table of entries and selectively choose the alerts that are to be received by the one or more parties 140.

According to one implementation, the alerts 130 may be sent to electronic devices of one or more parties 140 that are within proximity of the event described in the first social media post 120 (e.g., the event described in the first entry 202). For example, the computing device 102 may access a location database that indicates a residence address (or business address) of the one or more parties 140. If the location of the event in the first social media post 120 is proximate to the residence address (or business address) of a particular person in the location database, the computing device 102 may generate an alert 130 for the particular person. Non-limiting examples of the alert may include a short message service (SMS) message describing the event, an automated phone call describing the event, an email describing the event, etc.

The analyst may also click the cursor on a perform map search option 240 to perform a map search based on a location descriptive term for a selected entry. For example, if the analyst clicks the perform map search option 240 while the first entry 202 is selected, the computing device 102 may perform a map search based on a location descriptive term in the first social media post 120. To illustrate, referring to FIG. 3, the computing device 102 may generate a map display 300 (shown on the user interface display 109) that includes a representation of a particular geographic location indicated by the first social media post 120, the location descriptive term in the first social media post 120, and a selectable option to designate the particular geographic location as the second estimated location. For example, the map display 300 includes a representation of a region in Los Angeles, Calif. As described above, the first social media post 120 includes the term "Crenshaw Boulevard". Thus, the map display 300 may include Crenshaw Boulevard.

Figure 3:
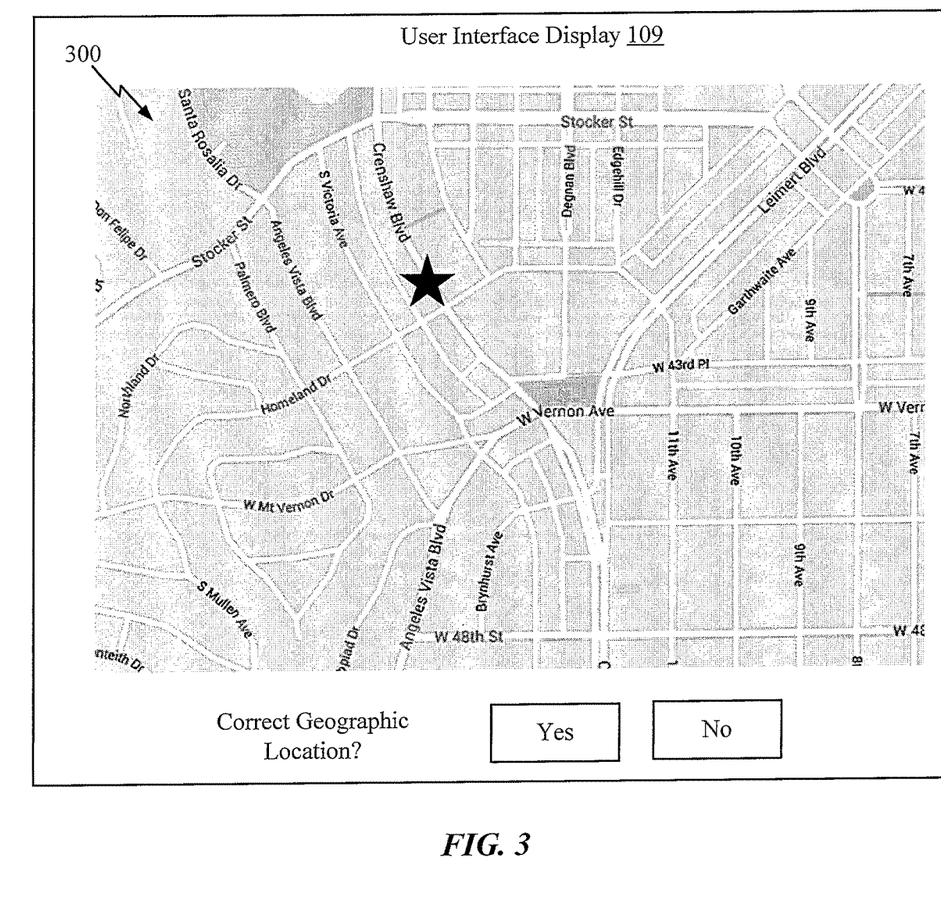
FIG. 3 depicts a user interface display generated by the computing device of FIG. 1.

The map display 300 may also include the option to designate Crenshaw Boulevard (indicated by the star) as location of the event (e.g., the earthquake). For example, the default estimated location associated with the event may be determined based on a default geographic location associated with the first social media account. Thus, the estimated location for the event is Los Angeles, Calif. because the first social media account includes Los Angeles, Calif. in the biography section, as described above. However, the computing device may change the location of the event from the default location to a second estimated location based on a result of the map search. As a non-limiting example, if the analyst clicks the "Yes" option in the map display 300, the computing device 102 may assign Crenshaw Boulevard (e.g., the second estimated location) as the location of the event. However, if the analyst clicks the "No" option in the map display 300, the computing device 102 may maintain the default estimated location (e.g., Los Angeles, Calif.) as the location of the event.

Referring back to FIG. 2, the table of entries 111 may also include other information about each entry 202, 204, 206. As a non-limiting example, the table of entries 111 may include a status of each entry 202, 204, 206. The status may indicate whether a particular entry is revised, new, deleted, active, etc. The table of entries 111 may enable the analyst to evaluate multiple social media posts at a relatively high rate to determine which social media posts to provide to the one or more parties 140 of FIG. 1. For example, the analyst of FIG. 2 may evaluate each entry 202, 204, 206 in the table of entries 111 and select entries for which the computing device 102 generates the alerts 130.

Figure 4:
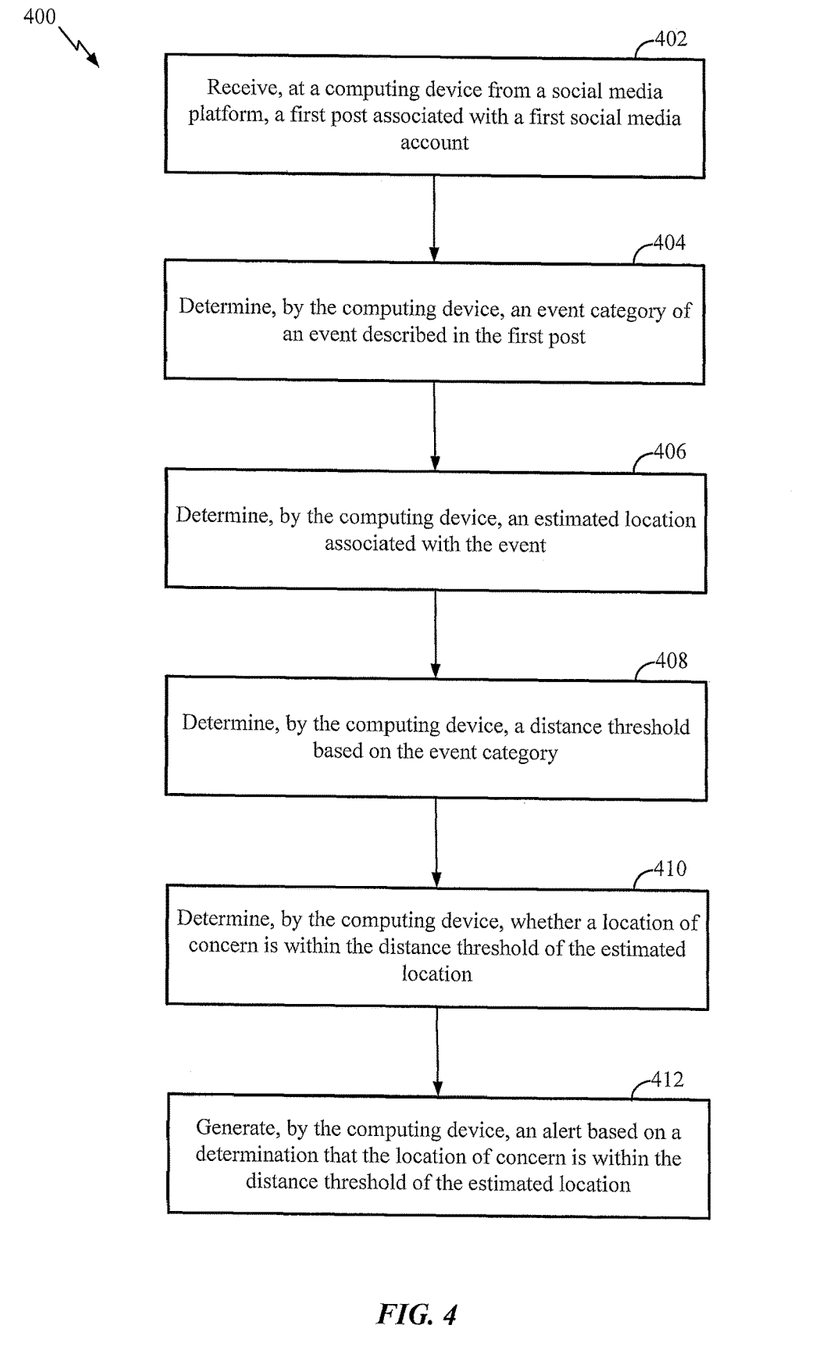
FIG. 4 is a flow chart of a method for generating one or more alerts based on source data including social media posts.

Referring to FIG. 4, a flow chart of a particular implementation of a method 400 of generating one or more alerts based on social media posts is shown. The method 400 may be performed using by the computing device 102 of FIG. 1.

The method 400 includes receiving, at a computing device from a social media platform, a first post associated with a first social media account, at 402. For example, referring to FIG. 1, the one or more social media platforms 104 may receive the first social media post 120 associated with a first social media account, the second social media post 122 associated with a second social media account, and the third social media post 124 associated with a third social media account. According to one implementation, the method 400 may include detecting (e.g., accurately detecting) the first post based on a word pattern search of available data. The first post may include potentially actionable data, and the first social media account may be assigned a specific level of trust.

The method 400 also includes determining, by the computing device, an event category of an event described in the first post, at 404. For example, referring to FIG. 1, the event category determination logic 106 may determine that each social media post 120, 122, 124 is associated with an earthquake (e.g., the "event") based on the text provided in the social media posts 120, 122, 124. The first and second social media posts 120, 122 include the term "earthquake" and the third social media post 124 includes an "earthquake" hashtag. Based on the determination, the event category determination logic 106 may determine that each social media post 120, 122, 124 may be categorized as under an "earthquake" event category or a "natural disaster" event category. According to one implementation of the method 400, determining the event category of the event includes comparing terms in the first post to event mapping data that maps particular terms to corresponding event categories.

The method 400 further includes determining, by the computing device, an estimated location associated with the event, at 406. For example, referring to FIG. 1, the location determination logic 108 may access a biography of each social media account to determine the location of the social media account (e.g., the source location). In the example of FIG. 1, the biography of each social media account may include "Los Angeles, Calif." in a "geographic location" field. Based on the information in the geographic location field, the location determination logic 108 may determine that the earthquake is located in Los Angeles, Calif.

According to another implementation, the location determination logic 108 may determine the estimated location of the event based on the text provided in the social media posts 120, 122, 124. For example, the first and third social media posts 120, 124 include the phrase "Los Angeles Area". Thus, based on the text provided in the first and third social media posts 120, 124, the location determination logic 108 may determine that the estimated location of the event (e.g., the earthquake) is Los Angeles, Calif. Thus, the estimated location may be determined based on a location descriptive term in the first post.

The text provided in the second social posts 122 indicates two different locations, Los Angeles and San Diego. Based on the context of the text, the location determination logic 108 may determine the event occurs in San Diego, as opposed to Los Angeles. However, the location determination logic 108 may determine that the second social media account (e.g., "Practical_Joker") is not a trusted content source and that the first and third social media accounts (e.g., "LA_News" and "LA_Times") are trusted content sources. For example, the listing of trusted content sources 119 in the database 118 may identify the first and third social media accounts as trusted content sources. The second social media account may not be listed in the listing of trusted content sources 119. Thus, the location determination logic 108 may determine that the second social media account is a non-trusted content source and may disregard information from the second social media post 122, including the location information.

The method 400 also includes determining, by the computing device, a distance threshold based on the event category, at 408. For example, referring to FIG. 1, determining the distance threshold may include accessing the distance mapping data 123 that maps particular event types to corresponding distance thresholds. The distance threshold determination logic 110 may look up earthquake events in the distance mapping data 123 to determine a distance threshold of the event (e.g., the earthquake). As a non-limiting example, the distance threshold determination logic 110 may determine that the threshold for an earthquake spans 150 miles from the center of the earthquake. Thus, the distance threshold determination logic 110 may determine the distance threshold for the earthquake associated with the social media posts 120, 122, 124 is 150 miles. According to another implementation, the distance threshold may be user-specified. For example, a social media post may specify a range of impacted areas for a particular event. To illustrate, a fourth social media post (not shown) may include text stating that vibrations from the earthquake have been felt as far as 125 miles away. As another example, the distance mapping data 123 may include distance thresholds that are specified by an analyst (or user). To illustrate, the analyst may store distance mapping data 123 in the database 118 to indicate that the distance threshold for an earthquake is 150 miles.

The method 400 further includes determining, by the computing device, whether a location of concern is within the distance threshold of the estimated location, at 410. Determining whether the location of concern is within the distance threshold of the estimated location may include accessing location data that specifies geographic locations of a set of locations of concern and determining, based on the location data and the distance threshold, whether any location of concern of the set of locations of concern is within the threshold distance of the estimated location. Referring to FIG. 1, the event proximity logic 112 may determine whether the location of concern is within 150 miles of Los Angeles, Calif. (e.g., the estimated location of the earthquake). The computing device 102 may determine the location of concern based on user-defined preferences. As a non-limiting example, a user of the computing device 102 may set the location of concern to a particular city, geographic region, street address, etc. In FIG. 1, the location of concern is set to the city of a particular business. For example, the location of concern is set to Anaheim, Calif. (e.g., the city where XYZ Company is located). Thus, the event proximity logic 112 may determine whether Anaheim, Calif. is within 150 miles of Los Angeles, Calif.

The method 400 also includes generating, by the computing device, an alert based on a determination that the location of concern is within the distance threshold of the estimated location, at 412. For example, referring to FIG. 1, the alert generator 116 may be configured to automatically (e.g., without user input) generate one or more alerts 130 if the location of concern is within the distance threshold of the estimated location. For example, the alert generator 116 may send an electronic notification to one or more parties 140 associated with the location of concern if the location of concern is within the distance threshold of the estimated location. The electronic notification may include information in the social media posts 120, 124 from trusted content sources. For example, the electronic notification may include information in the first and third social media posts 120, 124. According to the implementation described with respect to FIG. 1, the one or more parties 140 may include employees of XYZ Company in Anaheim, Calif.

According to one implementation, the method 400 may include generating a user interface display that includes a first entry associated with the event. The first entry may include the event category and first information based on the first post. The first information may include a time and date stamp associated with the event, content of the first post, information descriptive of the first social media account, and the estimated location associated with the event. For example, referring to FIG. 2, the table of entries 111 may include the first entry 202 that includes first information based on the first social media post 120.

According to one implementation, the first entry includes one or more selectable options associated with the event. The method 400 may further include, responsive to selection of a particular selectable option, generating a search request based on the first entry and searching, based on the search request, a database of other posts to identify a second post that includes additional information related to the event. The first post may be received based on the first social media account being associated with a trusted content source identified in a listing of trusted content sources. The other posts may be associated with non-trusted content sources that are not identified by the listing of trusted content sources. According to one implementation, the search request may automatically specify a time range based on a time associated with the event. The search request may include an option for the analyst to modify the time range. The search request may also specify other search fields, such as a location, a social media account, an event category, etc.

According to one implementation of the method 400, the user interface display may include a table of entries including the first entry and at least one second entry. Each entry of the table of entries may be associated with a respective event, and each entry of the table of entries may be associated with a respective selectable option to remove the event from the user interface display.

According to one implementation of the method 400, the table of entries may include a first entry associated with the event and at least one second entry associated with a second event. Each entry of the table of entries may include a respective event category and a respective estimated location. Each entry of the table of entries may be associated with one or more selectable options to edit the table of entries.

According to one implementation, the estimated location associated with the event may be determined based on a default geographic location associated with the first social media account. The method 400 may also include determining a second estimated location associated with the event. The second estimated location may be determined based on content of the first post that is descriptive of a geographic location of the event. The second estimated location may be determined by performing a map search based on a location descriptive term in the first post. The second estimated location may also be determined by generating, based on a result of the map search, a map display that includes a representation of a particular geographic location, the location descriptive term, and a selectable option to designate the particular geographic location as the second estimated location.

According to one implementation, the method 400 may include generating a user interface display that includes a first entry associated with the event and a selectable option to generate a search request based on the first entry. Responsive to selection of the selectable option, the method 400 may include searching a database of other posts based on the search request.

The method 400 of FIG. 4 may enable the computing device 102 to alert one or more parties 140 of different events occurring near a location of the one or more parties 140. Because the alerts 130 are generated based on social media posts from trusted content sources, the information provided to the one or more parties in the alerts 130 may be reliable and time-sensitive. For example, the one or more parties 140 may receive the information in near-real time as opposed to waiting for the evening news to receive the information.

Figure 5:
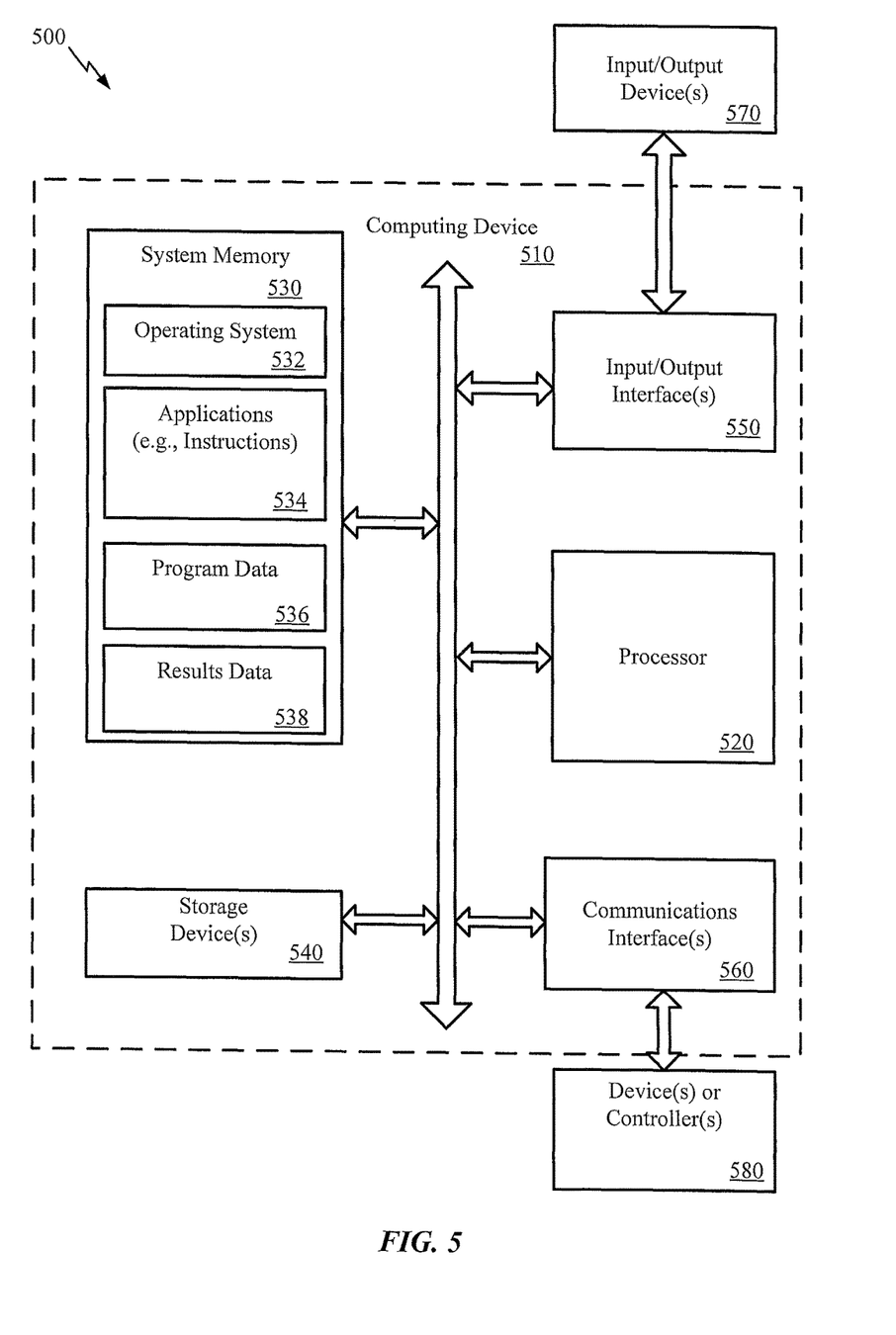
FIG. 5 is a diagram of a computing device that is operable to generate one or more alerts based on source data including social media posts.

Referring to FIG. 5, an illustration of a block diagram of a computing environment 500 including a computing device 510 configured to support implementations of computer-implemented methods and computer-executable program instructions (or code) according to the present disclosure. For example, the computing device 510, or portions thereof, may execute instructions according to the method 400 of FIG. 4. In a particular implementation, the computing device 510 of FIG. 5 may correspond to the computing device 102 of FIG. 1. Alternatively, the computing device 510 of FIG. 5 may be coupled to the computing device 102 of FIG. 1 via one or more of the interfaces.

The computing device 510 may include a processor 520. The processor 520 may communicate with the system memory 530, one or more storage devices 540, one or more input/output interfaces 550, the one or more communications interfaces 560, or a combination thereof. The system memory 530 may include volatile memory devices (e.g., random access memory (RAM) devices), nonvolatile memory devices (e.g., read-only memory (ROM) devices, programmable read-only memory, and flash memory), or both. The system memory 530 may include an operating system 532, which may include a basic/input output system for booting the computing device 510 as well as a full operating system to enable the computing device 510 to interact with users, other programs, and other devices. The system memory 530 may include one or more applications 534 which may be executable by the processor 520. For example, the one or more applications 534 may include instructions executable by the processor 520 to perform various operations. Further, the system memory 530 may include program data 536 usable for performing various operations described herein. The system memory 530 may also include results data 538 generated based on one or more connector tests. The results data 538 may be generated by the processor 520 or may be generated by another device and received via the one or more communication interfaces 560.

As an example, the application(s) 534 may include instructions executable by the processor 520 to receive the social media posts 120, 122, 124 associated with the social media accounts. The applications 534 may also be executable by the processor 520 to determine an event category of an event described in the first social media post 120. The applications 534 may also be executable by the processor 520 to determine an estimated location associated with the event. The applications 534 may also be executable by the processor 520 to determine a distance threshold based on the event category. The applications 534 may further be executable by the processor 520 to determine whether a location of concern is within the distance threshold of the estimated location. The applications may also be executable by the processor 520 to generate an alert based on a determination that the location of concern is within the distance threshold of the estimated location.

The processor 520 may also communicate with one or more storage devices 540. For example, the one or more storage devices 540 may include nonvolatile storage devices, such as magnetic disks, optical disks, or flash memory devices. The storage devices 540 may include removable memory devices, non-removable memory devices, or both. The storage devices 540 may be configured to store the operating system 532, images of the operating system 532, the applications 534, the program data 536, or a combination thereof. In a particular implementation, the system memory 530, the storage devices 540, or both, include tangible computer-readable media.

The processor 520 may communicate with one or more input/output interfaces 550. The one or more input/output interfaces enable the computing device 510 to communicate with one or more input/output devices 570 to facilitate user interaction. The processor 520 may detect interaction events based on user input received via the input/output interfaces 550. Additionally, the processor 520 may send a display to a display device via the input/output interfaces 550. The processor 520 may communicate with devices or controllers 580 via the one or more communications interfaces 560.

Examples described above illustrate but do not limit the disclosure. It should also be understood that numerous modifications and variations are possible in accordance with the principles of the present disclosure. Accordingly, the scope of the disclosure is defined by the following claims and their equivalents.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. As the following claims reflect, the claimed subject matter may be directed to less than all of the features of any of the disclosed examples.

What is claimed is:

1. A method comprising:
    receiving, at a computing device from a social media platform, a first post associated with a first social media account;
    detecting, by the computing device, that the first post comprises actionable data;
    determining, by the computing device, a level of trust of the first social media account based on user engagement with the first social media account, wherein the user engagement is based on a number of subscribers to the first social media account;
    determining, by the computing device, that the first social media account is relevant and has a level of trust that satisfies a trust threshold;
    determining, by the computing device, an event category of an event described in the first post;
    determining, by the computing device, an estimated location associated with the event;
    accessing, from a memory, distance mapping data that maps particular event categories to corresponding distance thresholds, wherein the distance mapping data maps a first event category of the particular event categories to a first distance threshold, and wherein the distance mapping data maps a second event category of the particular event categories to a second distance threshold that is distinct from the first distance threshold;
    determining, by the computing device, a distance threshold based on the event category and the distance mapping data;
    determining, by the computing device, that a location of concern is within the distance threshold of the estimated location; and
    generating, by the computing device, an alert in response to the determination that the location of concern is within the distance threshold of the estimated location and in response to the determination that the level of trust of the first social media account satisfies the trust threshold.

2. The method of claim 1, further comprising: detecting the first post at the computing device; and determining, by the computing device, a, wherein determining the level of trust of the first social media account by further includes comparing the first social media account to a stored list of social media accounts, wherein the stored list of social media accounts identifies trusted accounts.

3. The method of claim 2, wherein the first post is detected based on a heuristically-determined word pattern search, wherein the heuristically-determined word pattern search includes searching for preferred event categories.

4. The method of claim 1, further comprising generating a user interface display that includes a first entry associated with the event, the first entry including the event category and first information based on the first post.

5. The method of claim 4, wherein the first information includes a time and date stamp associated with the event, content of the first post, information descriptive of the first social media account, and the estimated location associated with the event.

6. The method of claim 4, wherein the first entry further includes one or more selectable options associated with the event, and further comprising, responsive to selection of a particular selectable option: generating a search request based on the first entry; and searching, based on the search request, a database of other posts to identify a second post that includes additional information related to the event.

7. The method of claim 6, wherein the first post is received based on the first social media account being associated with a trusted content source identified in a listing of trusted content sources, and wherein the other posts are associated with non-trusted content sources that are not identified by the listing of trusted content sources.

8. The method of claim 4, wherein the user interface display includes a table of entries including the first entry and at least one second entry, wherein each entry of the table of entries is associated with a respective event, and wherein each entry of the table of entries is associated with a respective selectable option to remove the event from the user interface display.

9. The method of claim 1, wherein the estimated location associated with the event is determined based on a default geographic location associated with the first social media account, based on a location descriptive term in the first post, or based on a combination thereof.

10. The method of claim 9, further comprising determining a second estimated location associated with the event, wherein the second estimated location is determined based on content of the first post that is descriptive of a geographic location of the event.

11. The method of claim 10, wherein the second estimated location is determined by: performing a map search based on a location descriptive term in the first post; and generating, based on a result of the map search, a map display that includes a representation of a particular geographic location, the location descriptive term, and a selectable option to designate the particular geographic location as the second estimated location.

12. The method of claim 1, wherein determining the event category of the event includes comparing terms in the first post to event mapping data that maps particular terms to corresponding event categories.

13. The method of claim 1, wherein determining whether the location of concern is within the distance threshold of the estimated location includes: accessing location data that specifies geographic locations of a set of locations of concern; and determining, based on the location data and the distance threshold, whether any location of concern of the set of locations of concern is within the threshold distance of the estimated location.

14. The method of claim 1, further comprising using heuristic data analytics to determine the event category, determine the estimated location, determine the distance threshold, determine whether the location of concern is within the distance threshold of the estimated location, generate the alert, or a combination thereof.

15. A computing device comprising:
a processor; and
a memory accessible to the processor, the memory storing instructions that are executable by the processor to cause the processor to perform operations including:
receiving, from a social media platform, a first post associated with a first social media account;
detecting, by the computing device, that the first post comprises actionable data;
determining a level of trust of the first social media account based on user engagement with the first social media account, wherein the user engagement is based on a number of subscribers to the first social media account;
determining that the first social media account is relevant and has a level of trust that satisfies a trust threshold;
determining an event category of an event described in the first post;
determining an estimated location associated with the event;
accessing, from a memory, distance mapping data that maps particular event categories to corresponding distance thresholds, wherein the distance mapping data maps a first event category of the particular event categories to a first distance threshold, and wherein the distance mapping data maps a second event category of the particular event categories to a second distance threshold that is distinct from the first distance threshold;
determining a distance threshold based on the event category and the distance mapping data;
determining that a location of concern is within the distance threshold of the estimated location; and
generating an alert in response to the determination that the location of concern is within the distance threshold of the estimated location and in response to the determination that the level of trust of the first social media account satisfies the trust threshold.

16. The computing device of claim 15, wherein the operations further comprise:
generating a user interface display that includes a table of entries, the table of entries including a first entry associated with the event and at least one second entry associated with a second event, wherein each entry of the table of entries includes a respective event category and a respective estimated location;
receiving, from a second platform, data associated with the event; and
generating, by the computing device, a second alert based on the data.

17. A non-transitory computer-readable storage device storing instructions that are executable by a processor to cause the processor to perform operations including:
receiving, from a social media platform, a first post associated with a first social media account;
detecting that the first post comprises actionable data;
determining a level of trust of the first social media account based on user engagement with the first social media account, wherein the user engagement is based on a number of subscribers to the first social media account;
determining that the first social media account is relevant and has a level of trust that satisfies a trust threshold;
determining an event category of an event described in the first post;
determining an estimated location associated with the event;
accessing, from a memory, distance mapping data that maps particular event categories to corresponding distance thresholds, wherein the distance mapping data maps a first event category of the particular event categories to a first distance threshold, and wherein the distance mapping data maps a second event category of the particular event categories to a second distance threshold that is distinct from the first distance threshold;

determining a distance threshold based on the event category and the distance mapping data;

determining that a location of concern is within the distance threshold of the estimated location; and generating an alert in response to the determination that the location of concern is within the distance threshold of the estimated location and in response to the determination that the level of trust of the first social media account satisfies the trust threshold.

18. The non-transitory computer-readable storage device of claim 17, wherein each event associated with the first event category is associated with the first distance threshold.

* * * * *

UNITED STATES PATENT AND TRADEMARK OFFICE
CERTIFICATE OF CORRECTION

PATENT NO. : 10,440,092 B2  
APPLICATION NO. : 15/158068  
DATED : October 8, 2019  
INVENTOR(S) : Thomas Austin et al.

Page 1 of 1

It is certified that error appears in the above-identified patent and that said Letters Patent is hereby corrected as shown below:

In the Claims

Claim 2, Column 16, Lines 53 through 59, change:
"2. The method of claim 1, further comprising:
detecting the first post at the computing device; and determining, by the computing device, a, wherein determining the level of trust of the first social media account by further includes comparing the first social media account to a stored list of social media accounts, wherein the stored list of social media accounts identifies trusted accounts."

To read:
--2. The method of claim 1, further comprising:
detecting the first post at the computing device, wherein determining the level of trust of the first social media account further includes comparing the first social media account to a stored list of social media accounts, wherein the stored list of social media accounts identifies trusted accounts.--

Signed and Sealed this  
Sixteenth Day of June, 2020

Andrei Iancu  
*Director of the United States Patent and Trademark Office*